United States Patent [19]

Wolf et al.

[11] 3,900,448

[45] Aug. 19, 1975

[54] COPOLYAMIDES WHICH CONTAIN QUINAZOLINEDIONE STRUCTURES

[75] Inventors: Gerhard Dieter Wolf, Dormagen; Francis Bentz, Cologne, both of Germany

[73] Assignee: Bayer Aktiengesellschaft, Leverkusen, Germany

[22] Filed: Nov. 30, 1973

[21] Appl. No.: 420,372

[30] Foreign Application Priority Data

Dec. 2, 1972 Germany.............................. 2259123

[52] U.S. Cl.......... 260/78 R; 260/30.2; 260/30.6 R; 260/30.8 R; 260/32.6 N; 260/47 CZ; 260/63 N
[51] Int. Cl...................... C08g 20/20; C08g 20/22
[58] Field of Search............ 260/78 R, 63 N, 47 CZ

[56] References Cited

UNITED STATES PATENTS

| 3,527,732 | 9/1970 | Wolf et al............................. 260/47 |
| 3,574,166 | 4/1971 | Radlmann et al..................... 260/49 |
| 3,671,614 | 6/1972 | Kunzel et al......................... 260/47 |

*Primary Examiner*—Lester L. Lee
*Attorney, Agent, or Firm*—Plumley & Tyner

[57] ABSTRACT

This invention relates to high molecular weight aromatic copolyamides which contain quinazolindione structures. They can be obtained by copolycondensation of quinazolinedione diamines with mixtures of 25 to 99 mol-% of isophthalic acid dichloride and 1 to 75 mol-% terephthalic acid dichloride.

3 Claims, No Drawings

COPOLYAMIDES WHICH CONTAIN QUINAZOLINEDIONE STRUCTURES

This invention relates to high molecular weight aromatic copolyamides which contain quinazolinedione structures.

Polyamides which contain quinazolinedione structures have already been disclosed in German Offenlegungsschrift Nos. 1,720,686 and 1,720,754. These polyamides, which have a relative viscosity of between 1.3 and 2.8, can be worked up into threads and fibres which are stable at high temperatures and have exceptionally good textile technological properties. It has been found that 7-amino-3-(p-aminophenyl)-2,4-(1H,3H)-quinazolinedione is particularly advantageous for use as the diamine component.

The dicarboxylic acid component used for producing these polyamides which contain quinazolinedione structures is preferably isophthalic acid dichloride because the polyamides obtained when using this component are readily soluble in polar organic solvents such as dimethylacetamide or N-methyl pyrrolidone so that the process for producing threads and fibres by spinning from solution can then be carried out very easily. Although the properties of such fibres of polyamides which have been produced by polycondensation of quinazolinedione diamines and isophthalic acid dichloride depend on the structure of the diamine component, they can as a whole be summarised by the following data:

Tensile strength: 3–6 g/dtex
Elongation: 5–15%
E-modulus: 400–1200 kg.wt./mm$^2$
Moisture absorption capacity: 8–13%
Thermo stability: An average tensile strength of 50% is obtained after 500 hours tempering at 250°C.
Light-fastness: An average tensile strength of 60–80% remains after 100 hours irradiation in the Xeno test.

The properties of these products are very different from the properties of quinazolinedione polyamides which contain the terephthaloyl group instead of the isophthaloyl group as a structural segment. These polyamides have the serious disadvantage that they are extremely difficult to dissolve and can only be spun from sulphuric acid or from polar solvents such as N-methyl pyrrolidone or hexamethyl phosphoric acid triamide which contain very high concentrations of solubilising agents such as alkali metal or alkaline earth metal salts, preferably lithium chloride. The quantity of solubilising agent added must be at least equal (in percent by weight based on the solvent) to the quantity of polyamide solid which is required to be dissolved. Moreover, these polyamides have a very rigid molecular chain structure which is due to the p-phenylene group derived from terephthalic acid and which causes very high viscosities. The solutions are therefore suitable for spinning only if their concentration of polyamide solids is less than 5%. In spite of the great manufacturing difficulties described above, it has been possible to obtain threads and fibres with comparatively good textile technological properties. Tensile strength, E-modulus and light-fastness are remarkably increased. Elongation and water absorption capacity of these threads are distinctly reduced. However, these fibres are of no economic significance on account of the great technical difficulties encountered in their manufacture.

It has now been found that copolyamides which do not have the disadvantages mentioned above but have numerous remarkable advantages can be obtained by copolycondensation of quinazolinedione diamines with mixtures of isophthalic acid dichloride and terephthalic acid dichloride. The following advantages are particularly important:

1. The relative good solubility of the copolyamides in polar organic solvents. Copolyamides which contain 1 to 25% of terephthalic acid units (based on the sum of isophthalic and terephthalic acid units) can be dissolved entirely without the aid of a solubilising agent. Copolyamides which contain approximately 30 to 75% of terephthalic acid units require a solubilising agent for complete solution, the amounts required increasing from very small quantities (at 30% terephthalic acid units) to about 25 percent by weight of solubilising agent, based on the polyamide solids content (at 75% terephthalic acid units), the solubilising agent used being preferably CaCl$_2$. The solutions obtained in this way are stable and easy to handle and can be spun without difficulties;

2. the substantially improved properties of the threads obtained from these copolyamides. It is surprisingly found that very small quantities (about 10%) of terephthalic acid units often result in a sharp improvement in the properties. The improvements are particularly marked in the strength and E-modulus while the hydrophilic character of the threads is reduced;

3. the possibility provided by copolycondensation of a quinazolinedione diamine with a mixture of isophthalic acid dichloride and terephthalic acid dichloride of producing "bespoke" threads and fibres which can be varied in their properties according to the quantity of terephthalic acid dichloride used.

This invention therefore relates to high-molecular weight aromatic copolyamides containing quinazolinedione structures, comprising 25 to 99 mols-%, preferably 60 to 95 mols-%, of structural units of the general formula I

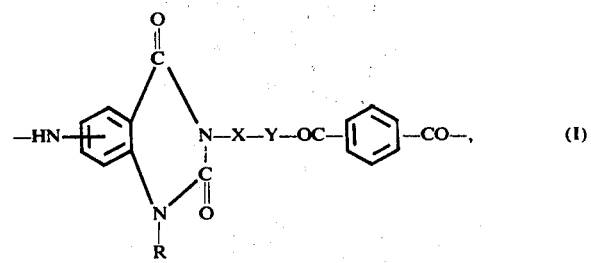

in which
X represents a divalent aromatic group consisting of one or more condensed aromatic rings or aromatic rings which are joined together by a single bond or by a —CO—, —CRR—, —O—, —S— or —SO$_2$— group, and their alkyl substitution or halogen substitution products,
Y represents the group —NH— or

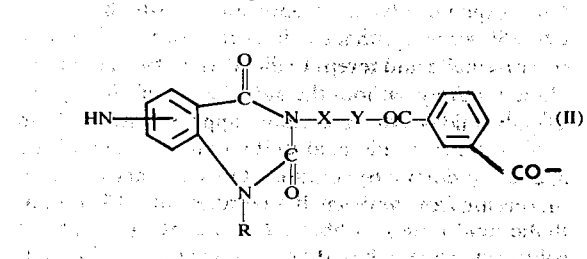

and

R represents a hydrogen atom or a $C_{1-4}$ alkyl group and 1 to 75 mols-%, preferably 5 to 40 mols-%, of structural units of the general formula II

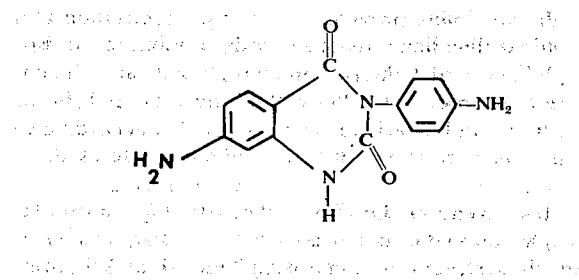

in which X, Y and R have the meanings defined above, and that they have a relative solution viscosity (determined on a 0.5% solution of the copolyamide in sulphuric acid at 25°C) of 1.3 to 4.5.

One may, of course, condense several different such diamines which contain quinazolinedione rings together. In addition, other completely aromatic diamines or diamines which contain heterocyclic groups may be included as codiamines.

The following are examples of diamines containing quinazolinedione structures which may be used:

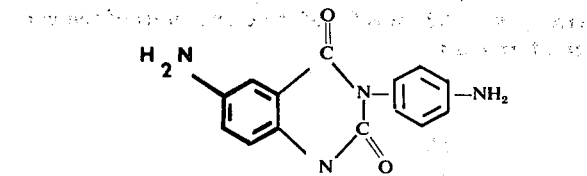

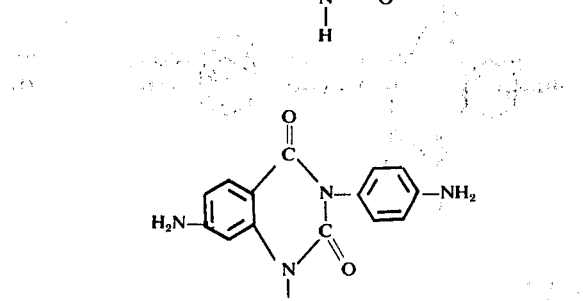

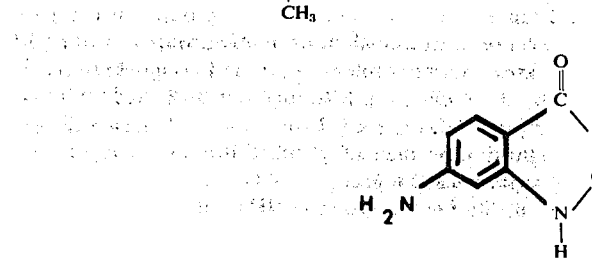

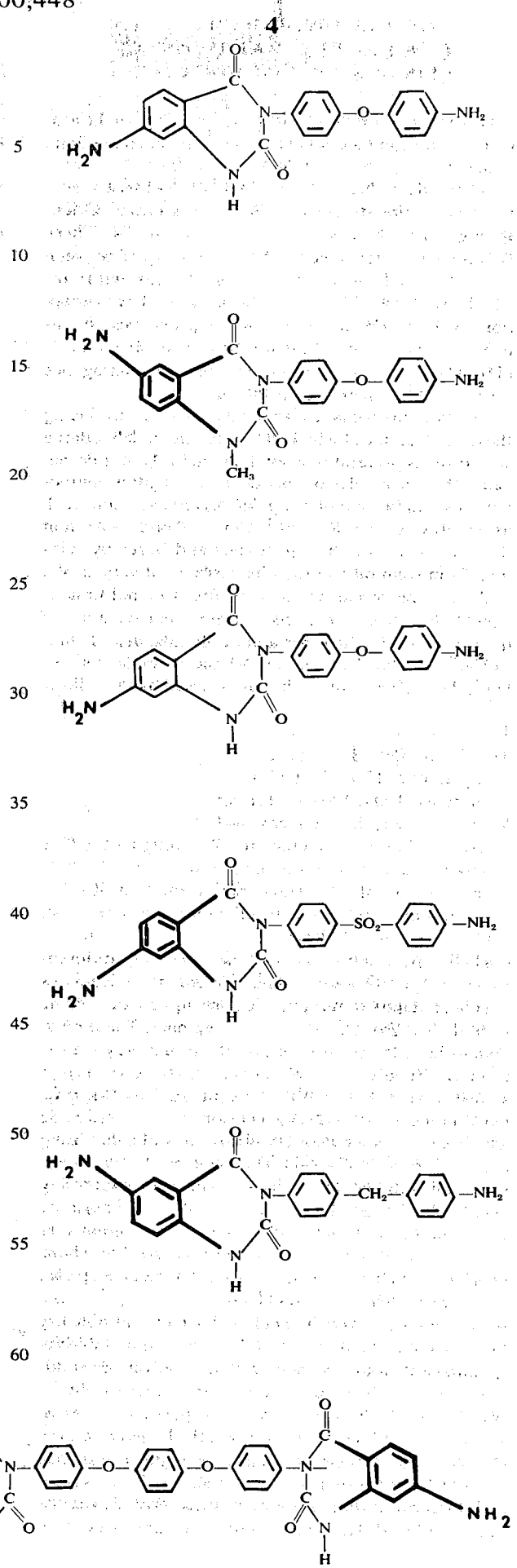

It is particularly preferred, however, to use 7-amino-3-p-aminophenyl-2,4-(1H,3H)-quinazolinedione.

These diamines which contain 2,4-quinazolinedione ring systems can be prepared according to an earlier proposal of the present Applicants (see DOS No. 1,720,686; DOS No. 1,802,079 and DOS No. 2,103,877), for example by reacting 4- or 5-nitroanthranilic acid esters with aromatic isocyanates which contain a nitro group, cyclising the resulting urea derivatives in o-dichlorobenzene/pyridine (20:1) and then reducing the nitro groups. The same diamines with 2,4-quinazolinedione ring systems may also be obtained, for example, by a modified process in which 4- or 5-nitroanthranilic acid is reacted with aromatic isocyanates which contain a nitro group, and the o-ureidobenzoic acids which are formed as intermediate products are then cyclised in N-methyl pyrrolidone in the presence of $P_2O_5$ or e.g. in dimethylformamide with the aid of phosgene, and the nitro groups are then catalytically reduced.

Polycondensation is carried out by known methods such as interface polycondensation but preferably by solution polycondensation in polar organic solvents such as N,N-dialkylcarboxylic acid amides, preferably N,N-dimethylacetamide or N-alkyl-substituted lactams, preferably N-methyl pyrrolidone, or in tetramethyl urea or hexamethyl phosphoric acid triamide or in mixtures of such polar aprotic solvents without additional acid acceptors but optionally in the presence of solubilising agents such as alkali metal halides or alkaline earth metal halides if, due to the presence of a substantial quantity of copolymerised terephthalic acid units, such solubilising agents are necessary to keep the copolyamides in solution as they are formed. The condensation is carried out at temperatures of between −30° and 150°C, preferably between −10° and 30°C. The reaction times may vary from 1 to 30 hours. The solids content of the solutions is 5 to 40%, preferably 10 to 25%. In order to achieve very high molecular weight reaction products, the diamine and dicarboxylic acid dichloride components should be used in equimolar quantities, but in principle polycondensation may also be carried out with an excess or subequivalent amount of dicarboxylic acid dichloride. The dicarboxylic acid dichloride may be added in several small portions over a prolonged period of time to the solution or suspension of the diamines in the solvent but in some cases it is advisable to add the whole quantity of dicarboxylic acid dichloride at once and preferably with cooling.

The polyamides may either be spun directly from the polycondensation solution, if desired first neutralising the hydrochloric acid, e.g. with ethylene oxide, propylene oxide or Ca(OH)$_2$ or LiOH or they may be worked up into threads or fibres after precipitation from the polycondensation solution with precipitating agents such as water, alcohols or ketones, drying and redissolving in the given polar solvents or in dialkyl sulphoxides such as dimethyl sulphoxide to which solubilising agent may be added if desired.

Spinning may in principle be carried out by the usual methods of dry or wet spinning. It is preferred to spin polyamide solutions in dimethylacetamide or N-methyl pyrrolidone which have a polyamide solids content of between 12 and 25%. In cases where solubilising agent was required, calcium chloride or lithium chloride is preferably used and is added in concentrations of 3–8%, based on the quantity of solvent. Viscosities of spinning solutions of between 500 and 1100 Poises (determined at 20°C in a rotary viscosimeter) are preferred although solutions with viscosities of up to 2500 Poises can still be spun without difficulty. The relative viscosity of the polyamides is between $\eta_{rel.} = 1.3$ and $\eta_{rel.} = 4.5$ but preferably between 1.8 and 3 (determined on a 0.5% solution in concentrated sulphuric acid at 25°C).

In the wet spinning process, the threads are coagulated in an aqueous precipitation bath at 50°–60°C and drawn off at the rate of 10–20 metres per minute from a 10-aperture die (aperture diameter 0.1 mm). In the case of the dry spinning process, the threads are extruded through a nozzle (aperture diameter 0.1 mm) into a spinning shaft charged with hot air at about 200°C and drawn off at the rate of 100 metres per minute.

The after-treatment is essential for producing threads with good textile technological properties. Both wet spun and dry spun threads are preferably first prestretched at a ratio of between 1:1.2 and 1:1.7 in boiling water and then washed in water at 60°C and dried. The final stretching is then carried out at a temperature of 380°–490°C and a stretching ratio of between 1:1.2 and 1:12.

The following Examples are to further illustrate the invention without limiting it.

COMPARISON EXAMPLE

This example describes the homocondensation of 3-(p-aminophenyl)-7-amino-2,4-(1H,3H)-quinazolinedione with isophthalic acid dichloride and the production and aftertreatment of the threads.

203 parts by weight of isophthalic acid dichloride are added in three portions in the course of about 3 hours to a suspension of 268 parts by weight of 3-(p-aminophenyl)-7-amino-2,4-(1H,3H)-quinazolinedione in 1410 parts by weight of anhydrous dimethylacetamide at room temperature. The suspension was then diluted with 700 parts by weight of dimethylacetamide and stirred at room temperature for 6 hours. 116 parts by weight of propylene oxide were added dropwise to neutralise the hydrochloric acid formed. The neutral solution had a viscosity of 1350 Poises at 20°C. The relative viscosity of the polymer determined on a 0.5% solution in concentrated sulphuric acid of a sample of polyamide which had been precipitated with water and dried at 120°C was 1.76. The polyamide solution was spun through a 10-aperture die with an aperture diameter of 0.1 mm into a water bath at 20°C at a draw-off rate of 10 metres per minute. The threads were then stretched in two stages, first in boiling water and then over a hot iron at 400 to 430°C, the total stretching ratio between 1:5–6. The properties of the threads are shown in Table I.

EXAMPLE 1

A mixture of 192.8 parts by weight of isophthalic acid dichloride (IPC) and 10.2 parts by weight of terephthalic acid dichloride (TPC) (corresponding to 5% of terephthalic acid dichloride based on the sum of the two dicarboxylic acid) was added in portions to a suspension of 268 parts by weight of 3-(p-aminophenyl)-7-amino-2,4-(1H,3H)-quinazolinedione in 1410 parts by weight of absolute dimethylacetamide at room temperature. After dilution of the highly viscous polyamide solution with an additional quantity of dimethylacetamide and addition of 116 parts by weight of propylene oxide to neutralise the hydrochloric acid formed, the solution was spun and the resulting threads stretched as described in the comparison example. The properties are shown in Table I.

EXAMPLES 2–6

3-(p-aminophenyl)-7-amino-2,4-(1H,3H)-quinazolinedione were polycondensed with various other mixtures of isophthalic acid dichloride and terephthalic acid dichloride in a manner analogous to Example 1.

The ratios in which IPC and TPC were mixed in the various examples were as follows:

| Example | IPC:TPC |
|---|---|
| Example 2 | 90 : 10 |
| Example 3 | 85 : 15 |
| Example 4 | 75 : 25 |
| Example 5 | 50 : 50 |
| Example 6 | 25 : 75 |

In Examples 5 and 6, the hydrochloric acid liberated in the process of condensation was not neutralised with propylene oxide but with equivalent quantities of Ca(OH)$_2$. The necessary quantity of solubilising agent (CaCl$_2$) to form stable spinning solutions was thereby formed in these two solutions.

The results are summarised in Table I.

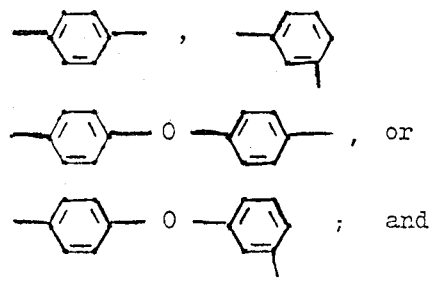

Y is — NH —;
and the remaining 75 to 1 mols-% of structural units of the general formula

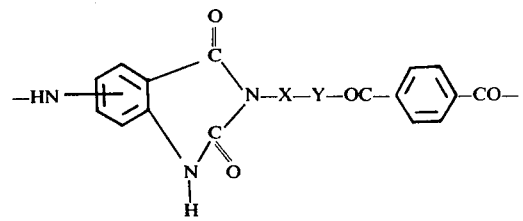

in which X and Y have the meanings defined above, said copolyamides having a relative viscosity ($\eta$ rel. determined on a 0.5% solution of the copolyamide in sulphuric acid at 25°C) of 1.3 to 4.5.

2. High-molecular weight copolyamides according to claim 1, comprising 60 to 95 mols-% of structural units of the formula Table I

| | Proportion of TPC in % | $\eta$ rel. | Tensile strength in g/dtex | Elongation in % | E-modulus in kp./mm$^2$ | Water absorption [+)] capacity in % |
|---|---|---|---|---|---|---|
| Comparison example | 0 | 1.76 | 3.9–4.5 | 8–10 | 600 | 11–13 |
| Example 1 | 5 | 2.07 | 5.0–5.5 | 2–3 | 3,300 | 8.7 |
| Example 2 | 10 | 2.19 | 7.3–8.8 | 4–5 | 3,100 | 7.5 |
| Example 3 | 15 | 2.19 | 7.5–8.5 | 2–3 | 4,300 | 8.0 |
| Example 4 | 25 | 2.4 | 8.0–8.9 | 2–3 | 4,650 | 7.9 |
| Example 5 | 50 | 2.3 | 7.1–8.5 | 1–2 | 5,500 | 7.1 |
| Example 6 | 75 | 2.55 | 8.1–9.0 | 1 | 7,000 | 5.9 |

[+)]To determine the moisture absorption capacity, the fibres are washed at 300°C, dried and then exposed to an atmosphere of 65% relative humidity at 20°C for 24 hours to enable them to absorb moisture. The fibres are then dried in a vacuum at 80°C and the moisture absorption is indicated as equilibrium weight absorption in % of the weight of absolutely dry fibre.

The values for lightfastness and thermo stability of threads from Examples 1 to 6 vary but it can be seen clearly that on average they are higher than in the threads obtained in the comparison example.

We claim:

1. High molecular weight aromatic copolyamides which contain quinazolinedione structures comprising 25 to 99 mols-% of structural units of the formula

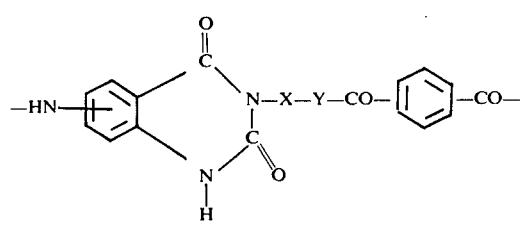

in which
X is

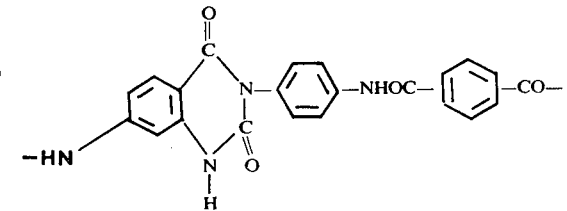

and the remaining 40 to 5 mols-% of structural units of the formula

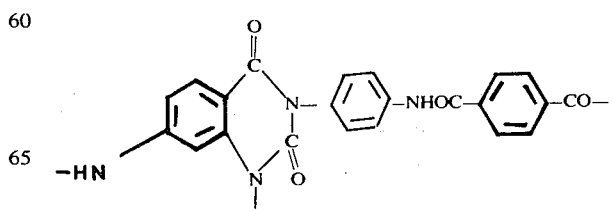

3. Fibers of high-molecular weight aromatic copolyamides according to claim 1, said fibers having a tensile strength of between 4 to 12 g/dtex and a modulus of elasticity of between 2000 and 10,000 kg.wt./mm$^2$.

* * * * *